(12) United States Patent
Vainionpää

(10) Patent No.: US 10,383,182 B2
(45) Date of Patent: Aug. 13, 2019

(54) OVEN FOR HEATING AND FRYING FOOD

(71) Applicant: R-MENU OY, Kangasala (FI)

(72) Inventor: Juha Vainionpää, Pirkkala (FI)

(73) Assignee: R-MENU OY, Kangasala (FI)

( * ) Notice: Subject to any disclaimer, the term of this patent is extended or adjusted under 35 U.S.C. 154(b) by 552 days.

(21) Appl. No.: 15/101,904

(22) PCT Filed: Nov. 10, 2014

(86) PCT No.: PCT/FI2014/050842
§ 371 (c)(1),
(2) Date: Jun. 4, 2016

(87) PCT Pub. No.: WO2015/082757
PCT Pub. Date: Jun. 11, 2015

(65) Prior Publication Data
US 2016/0316525 A1    Oct. 27, 2016

(30) Foreign Application Priority Data

Dec. 5, 2013 (FI) ...................................... 20136224

(51) Int. Cl.
*A47J 37/06* (2006.01)
*H05B 6/64* (2006.01)
(Continued)

(52) U.S. Cl.
CPC ............ *H05B 6/6479* (2013.01); *A47J 27/10* (2013.01); *A47J 37/0641* (2013.01);
(Continued)

(58) Field of Classification Search
CPC ..... H05B 6/647; H05B 6/6482; H05B 6/6485
(Continued)

(56) References Cited

U.S. PATENT DOCUMENTS 2,997,566 A * 8/1961 O'Donnell ........... H05B 6/6408
219/685
3,430,023 A * 2/1969 Tingley ................... F24C 15/04
126/200
(Continued)

FOREIGN PATENT DOCUMENTS

EP    1930660 A1    6/2008
EP    1965607 A1    9/2008
(Continued)

OTHER PUBLICATIONS

International Search Report for PCT/FI2014/050842, dated Mar. 2, 2015.
Written Opinion for PCT/FI2014/050842, dated Mar. 2, 2015.

*Primary Examiner* — Dana Ross
*Assistant Examiner* — Joe E Mills, Jr.
(74) *Attorney, Agent, or Firm* — FisherBroyles, LLP; Robert Kinberg

(57) ABSTRACT

An oven for heating and frying food, particularly a rapid cook oven, includes walls and an openable oven door delimiting an oven space and heaters to heat food in the oven space. Such heaters including: microwave radiation devices, a frying plate having an undersurface, and heat circulating-air devices comprising a flow duct for removing circulating air from the oven space and leading it back into the oven space after cleaning, and a fan installed in the flow duct for creating a circulating-air flow in the said flow duct. The oven additionally includes structure delimiting a cooker space, thermal insulation between the oven space and the cooker space and a heater comprising a cooker situated in the cooker space.

20 Claims, 11 Drawing Sheets

(51) Int. Cl.
    *A47J 27/10*     (2006.01)
    *F24C 11/00*     (2006.01)
    *F24C 15/32*     (2006.01)
    *H05B 6/80*     (2006.01)
    *A47J 37/12*     (2006.01)

(52) U.S. Cl.
    CPC ......... *A47J 37/0664* (2013.01); *A47J 37/128* (2013.01); *A47J 37/1209* (2013.01); *A47J 37/1219* (2013.01); *A47J 37/1295* (2013.01); *F24C 11/00* (2013.01); *F24C 15/32* (2013.01); *H05B 6/6473* (2013.01); *H05B 6/6494* (2013.01); *H05B 6/80* (2013.01)

(58) Field of Classification Search
    USPC ....... 219/682, 681, 702, 730, 752, 756, 757, 219/760, 763
    See application file for complete search history.

(56) References Cited

U.S. PATENT DOCUMENTS

| | | | | |
|---|---|---|---|---|
| 4,354,084 A | * | 10/1982 | Husslein | F24C 15/006 126/21 A |
| 5,166,487 A | * | 11/1992 | Hurley | F24C 15/322 122/4 R |
| 6,040,564 A | * | 3/2000 | Ueda | H05B 6/6479 219/401 |
| 6,761,159 B1 | * | 7/2004 | Barnes | F24C 15/2007 126/15 R |
| 6,900,421 B2 | * | 5/2005 | Varma | A61C 19/002 219/679 |
| 6,953,920 B2 | * | 10/2005 | Jeon | H05B 6/6479 126/21 A |
| 7,041,949 B2 | * | 5/2006 | Kim | A47J 37/0807 219/681 |
| 2006/0157479 A1 | * | 7/2006 | Claesson | A21B 1/245 219/681 |
| 2008/0105133 A1 | * | 5/2008 | McFadden | A21B 1/245 99/324 |
| 2008/0105136 A1 | | 5/2008 | McFadden | |
| 2008/0245788 A1 | * | 10/2008 | Choong | F24C 15/008 219/758 |
| 2011/0276184 A1 | * | 11/2011 | McKee | H05B 6/6485 700/276 |
| 2013/0119053 A1 | * | 5/2013 | Linton | F24C 15/16 219/681 |

FOREIGN PATENT DOCUMENTS

| | | |
|---|---|---|
| WO | 95/09519 A1 | 4/1995 |
| WO | 98/54517 A1 | 12/1998 |
| WO | 99/52328 A1 | 10/1999 |
| WO | 2008/144290 A2 | 11/2008 |
| WO | 2009/049077 A1 | 4/2009 |

* cited by examiner

OVEN FOR HEATING AND FRYING FOOD

CROSS-REFERENCE TO RELATED APPLICATIONS

This application is a U.S. National Stage of International Patent Application No: PCT/FI2014/050842 filed Nov. 10, 2014, designating the United States and claiming benefit of Finland Patent Application No. 20136224 filed Dec. 5, 2013.

TECHNICAL FIELD

The present invention relates to an oven for heating and frying food, particularly a rapid cook oven, which includes an oven space, which is delimited by walls and an openable oven door leading to the oven space, as well as the following heating means for heating food in the oven space:
microwave radiation devices,
a frying plate, and
heating circulating-air devices comprising a flow duct for removing circulating air from the oven space and leading it back into the oven space after cleaning, and a fan installed in the flow channel for creating a circulating-air flow in the flow duct.

BACKGROUND OF THE INVENTION

The use of rapid cook ovens is intended to bring food portions to a serving temperature as quickly as possible, which generally means within 30-180 seconds of the order being placed. A second intention is the best possible quality of food portions. The very different behaviour of food when being heated makes achieving the goals challenging. The goals are best achieved using hybrid ovens using more than one heating technique. Most generally, the heat sources used nowadays in rapid cook ovens are microwave radiation devices and electrical resistances, which are arranged to heat air being circulated through the oven space.

Hybrid ovens utilizing hot air and microwaves as heat sources are known from, for instance, the publications WO 95/09519 and WO 99/52328. Publication EP 1930660 A1, which discloses a circulating-air oven equipped with microwave heating, is also known from the prior art.

Contamination is a problem in closed air-circulation ovens. Magnetrons in particular are sensitive to dirtying. Publication WO 98/54517 discloses an oven, in which there is closed air circulation and a catalyser for cleaning the air.

Oil cookers are used particularly for the heating of potato chips. Such a solution is disclosed in, for instance, publication WO 98/54517. Known hybrid ovens do not have oil cookers. The main problem with oil cookers is dirtying of the oil. Publication WO 2008/144290 discloses an oil filtering technique. Further, the use of a cooker to heat frozen products creates a great deal of steam. A problem with ovens of the prior art is that several different devices are required to make a food portion, in which the components of the food portion are prepared at different temperatures and simultaneous preparation is difficult.

SUMMARY OF THE INVENTION

The invention is intended to create an oven, particularly a rapid cook oven, intended to heat and fry food, which combines, in the same oven, at least a traditional oven, microwave heating, and a cooker, so that in the oven several components of a food portion can be prepared simultaneously at different temperatures. The method according to present invention is characterized by an oven for heating and frying food, particularly a rapid cook oven, comprising an oven space, which is delimited by walls and an openable oven door leading to the oven space, as well as following heating means for heating food in the oven space: microwave radiation devices, a frying plate having an undersurface and heating circulating-air devices comprising a flow duct for removing circulating air from the oven space and leading it back into the oven space after cleaning, and a fan installed in the flow duct for creating a circulating-air flow in the said flow duct, wherein the oven further comprising a structure delimiting a cooker space and the heating means further comprising a cooker situated in the said cooker space, and the said structure comprising thermal insulation between the oven space and the cooker space.

This intention can be achieved by means of an oven, particularly a rapid cook oven, intended for heating and frying food, which includes an oven space, which is delimited by walls and an openable oven door leading to the oven space, as well as heating means for heating the foods in the oven space, being microwave radiation devices, a frying plate, and heating circulating-air devices, comprising a flow duct for removing circulating air from the oven space and leading it after cleaning back to the oven space, and a fan installed in the flow duct for creating a circulating air flow in the flow channel. The oven further includes a structure delimiting the cooker space and the heating devices further include a cooker located in the cooker space. The structure includes thermal insulation to prevent heat transfer between the oven space and the cooker space. The thermal insulation insulates the cooker from heat and thus prevents the higher temperature in the oven space from being transferred to the cooker and fatty steam burning onto the bottom of the frying plate. Thus, the temperature of the cooking liquid is prevented from becoming too high.

By means of the oven according to the invention, a food portion can be prepared very rapidly, as the components required for the food portion can be placed simultaneously in the oven, in which each of the components can be prepared at the temperature required by the component, as the oven contains different temperature zones.

The oven preferably further includes cleaning elements situated in the flow duct. With the aid of the cleaning elements, impurities contained in the circulating air can be effectively removed.

The oven preferably includes a limited flow connection between the cooker space and the oven space/flow duct permitting gases and vapours arising in the cooker to be removed to the oven space/flow duct and from there through the cleaning elements. With the aid of the flow connection, gases arising in the cooker can be directed to the flow duct, so that they cannot reach the oven space to disturb the heating of the components and to mix with them. In the flow connection, there is preferably a flow resistance, so that gases and vapours move mostly only due to excess pressure to the flow duct/oven space.

The cleaning elements are preferably a catalyser and/or a grease filter. With their aid, the circulating air is cleaned of odours and grease, so that its circulation does not cause problems.

The flow connection can be 0.5-4-mm, preferably 1-2-m wide. The flow connection will then be sufficiently narrow to prevent microwaves from progressing to the cooker space, and, on the other hand, sufficiently large to prevent sparking.

The thermal insulation can be an air space and/or a thermal-insulation panel. By means of such a construction, the transfer of heat is cut off.

Preferably, the construction is the frying plate arranged to delimit the said cooker space under the oven space. Situated underneath the frying plate, the cooker space is more effectively protected from the heat of the oven space and at the same time acts as a construction delimiting the oven space and the cooker space. The flow connection between the cooker space and the oven space will then function best.

According to a second embodiment, there can be a separate wall between the oven space and the cooker space. The cooker space can then be elsewhere than underneath the oven space.

The microwave-radiation devices preferably includes at least two magnetrons for creating temperature zones in the oven space. With the aid of at least two magnetrons, the microwave heating can be directed to the desired zone by using the magnetron that is located closest to the component to be heated.

Preferably, the frying plate is divided into at least two parts, each part of which has independently operable secondary heating means. Thus, for its part, the frying plate can be used to form different temperature zones in the oven.

The oven preferably includes at least two fans with motors and two secondary heating means for creating two different air circulations for the circulating-air heating. With the aid of two air circulations, it is also easier to achieve the desired heating temperatures of the components and the oven can be heated even more efficiently. The air circulation can then also be implemented without separate valves or other control means dividing the air circulation, which are needed to create two circulations with the aid of one fan. With the aid of the circulating-air means, the air in the oven can also be circulated through the catalyser, so that the oven can be implemented without a separate extractor hood.

The frying plate is preferably inside the oven space. The fumes arising on the frying plate will then remain in the oven, just like the fumes created by using the other heating devices, so that the oven can be manufactured without a separate extractor hood to remove external fumes. In addition, the formation of the frying plate inside the oven will improve the total energy economy of the oven, as the heat of the other heating means can be utilized to preheat the frying plate, and vice versa.

The cooker is preferably inside the oven, so that the steam rising from the cooker can be retained inside the oven and cleaned like the fumes arising on the frying plate.

The cooker is preferably a fat cooker. By means of a fat cooker, a very great heating output is achieved, which in turn accelerates the cooking of the product being cooked.

The inside of the frying plate preferably includes secondary heating means. The secondary heating means inside the frying plate are protected from splashes and, on the other hand, effectively conduct heat to the frying plate.

The undersurface of the frying plate can include insulation to prevent the transfer of heat from the oven space to the cooker. The insulation attached to the undersurface of the frying plate prevents the medium in the cooker from coming into contact with the secondary heating means of the frying plate, thus preventing the creation of excess smoke.

The secondary heating means are preferably electrical resistances. Electrical resistances are easy and cheap to implement and they can be used without separate ventilation built in connection with the oven. Further, electrical resistances are safer to use than, for example, heating means utilizing gas.

According to a second embodiment, the heating means and the secondary heating means can include a gas burner for producing heat. The use of a gas burner does not affect the power consumption of the oven, so that the momentary power consumption of the oven remains smaller. In addition, a gas burner is extremely efficient, rapid to use, and burns gas very cleanly.

The walls of the oven can include water channels running round the frying plate and a collection tank, to which the said water channels are led in order to recover liquid coming from food on the frying plate. The recovery of the liquid is important, so that the liquid will not, for example, run into the cooker when the oven door is opened. If the liquid to be used in the cooker is fat, liquid coming into contact with hot fat can cause violent foaming of the fat, or even an explosive fire.

The oven door can include an airtight seal arranged to close both the oven space and the cooker simultaneously from in front when the oven door is closed. Fumes possibly arising in connection with the heating of components in the oven and water vapour arising in the cooker will then remain inside the oven.

The oven preferably includes separate and moveable baskets to be situated in the cooking tank for placing food in them to put them into and take them out of the tank, and a basket frame, in which the baskets are placed, which basket frame includes a mesh cover to keep the products under the surface of the cooking liquid. With the aid of the baskets, placing the components to be heated in the cooker can be done safely and quickly. When using the basket frame, the components to be heated cook on all sides and the heating can be performed entirely without a separate stage of turning the components, the components being completely surrounded by the cooking liquid.

There is preferably a detachable protective cover in the cooker. With the aid of the use of the protective cover, the splashing of the cooker's cooking liquid out of the cooker can be prevented. In addition, the particularly dirtying parts of the cooker can be integrated in the detachable protective cover. At the same time, the protective cover advantageously prevents the baskets in the basket frame from rising out of the cooking liquid and prevents, for example, liquids that flow off the frying plate when the oven door is opened from entering the cooking liquid. Further, the protective cover also acts as a barrier to heat transfer.

According to one embodiment, the oven includes means for lifting the baskets under electric control. The baskets can then be lifted automatically out of the cooking liquid when their components are cooked, without the user themself needing to open the oven door and lift the products. Thus, in the oven it is possible, for example, to continue heating the components on the frying plate, even though the components in the cooker are already cooked. Lifting of the baskets prevents the components burning due to overlong heating.

According to one embodiment, in the cooker there is a closing element closing by positive operation with a feeding movement, which is arranged to close the cooker automatically when the oven door is closed. The positive operation can be implemented by using a shape-closing mechanism or by gravity. Positive control of the feed into the frying basket permits fat to be added safely, no matter whether it is in a solid or liquid form. Preferably, the closing element is arranged in the oven door to prevent the cooking liquid from splashing out of the cooker. Such a closing element is cheap to implement.

According to a second embodiment, the cooker is constructed as a permanent part of the structure of the oven. The oven can then be implemented without separate rails and other parts for pulling the cooker out of the oven, which in turn reduces the manufacturing costs of the oven.

The oven can include a steam recovery system for recovering steam. The recovery of steam, which would disturb the formation of different temperature zones, prevents the accumulation of steam in the oven space.

The recovery system preferably includes a condenser. With the aid of the condenser, a large amount of steam can be condensed into water requiring a considerably smaller volume, which can be led, for example, to a drain or a collection tank. This is important, as hundreds of litres of steam arise in the oven, which would otherwise be released into the kitchen when the oven door is opened.

According to one embodiment, the oven includes at least one cleaning element for collecting impurities from the circulating air. With the aid of the cleaning element the circulating air remains clean and does not contaminate the components of the food portion.

The walls can be of thermal insulation, thus permitting controlled heat transfer from the oven space outwards. With the aid of the controlled heat transfer, heat is transferred out from the oven, making control of the temperature of the cooker easier. The thermal insulation can be, for example, wool or a thermally insulating mass.

The oven preferably includes at least a grease filter and catalyser as cleaning elements. With their aid the circulating air remains effectively clean.

The oven according to the invention is preferably equipped with control elements, with the aid of which the gases and vapours released from the cooker are directed to travel through the same cleaning elements as the vapours and gases released from frying. A filter and catalyser can act as the cleaning elements.

The wall between the oven space and the flow channel can be perforated, which will prevent microwaves from progressing to the flow channel. The perforation also prevents the loss of power from the microwave-heating means to the external structures of the oven space.

The grease filter can be situated in the flow channel, separate from the wall of the oven chamber. Situated in this way, the filter is easier to handle. The microwave loss is also considerably smaller and control of the blowing is better. The handling of the grease filter can be performed from outside the oven chamber, from the front wall. The use of tools also permits handling when hot.

According to one embodiment, the roof of the oven space includes an upper baffle plate for guiding the circulating-air flow, above which upper baffle plate a resistance-element battery can be located, which can consist of three separate resistance elements, which can be controlled separately and which act on the different temperature zones of the oven space. With the aid of the resistance elements, the temperature of the air blown to a specific part of the oven space can be temporarily raised during the preparation of a recipe, without affecting the temperature of the whole oven space.

The temperature of the catalyser can be monitored actively and, on the basis of the measurement results, the temperature of the air entering the catalysed can be corrected during the program. A rapidly reacting air-heating resistance is preferably situated in the flow channel immediately before the catalyser. The radiant heat of this heating resistance heats both the catalyser and the flowing air.

In the rapid cook oven, the heating and frying of food is implemented partly with a known method with the aid of the microwave technique and circulating air heated by a thermal resistance. According to the invention, in the rapid cook oven, the cooker cooking liquid is also preferably heated with the aid of an electrical resistance. In the heating process, the heat of the oven space and the cooker are utilized for each other's benefit. The gases and vapours released from the cooker can be arranged to travel to the catalyser through the same cleaning elements as the vapours and gases released in frying.

By means of the active control of the oven, it is possible to achieve different temperatures for varying durations of time in the different temperature zones of the oven space during the food-preparation process and, during the times between, to exploit the temperature differences of the zones for power saving. In the heating of the air of the oven, in connection with the upper baffle plate there are preferably three separate, rapidly heating and cooling heating elements, which can be operated together or separately. In this connection, the heating elements act as second heating means. Variation in temperature can be achieved primarily by means of a rapidly heating and cooling air-heating resistance in connection with the upper baffle plate as well as by means of a rapidly heating and cooling frying plate. The circulating air can first be heated to the base temperature of the oven space and then the second resistance package in the vicinity of the upper baffle plate can heat part of the air blown from the upper baffle plate to become hotter. The cooker and the frying plate can each have their own temperature.

Each of the heating means can have its own temperature controller and measurement separately from the others. This can be implemented by means of software. The secondary heating means can be, for example, magnetrons and resistance packages.

In one embodiment of the catalyser's air-heating resistance package, there is one resistance package, which can be switched on separately, for each separate circulating-air flow for each catalyser, each resistance package of which includes temperature measurement. In the heating of the circulating air, for each circulating-air flow there can be one resistance package, in which there is at least one resistance, in which there is temperature measurement. The resistance equipped with temperature measurement should always be switched on, if the resistance package of the circulating-air flow in question is switched on. Power can be lowered by leaving out one or more resistance being without air temperature measurement. In terms of the temperature controller of this resistance package, it is not important how many resistances are switched on in the resistance package. The temperature controller can only control the one in which there is temperature measurement. The other two resistance elements that can, if desired, be switched off are assumed to behave in the same way when switched on, because the heating load is similar for all the resistances of the resistance package.

In one embodiment, the resistance packages are:
an air-heating resistance package above the upper baffle plate,
a resistance package of the frying plate,
a resistance package of the cooker,
as well as the air-heating resistance package of the catalyser referred to as an example.

In addition, the resistances in the upper baffle plate, and, if necessary in the other resistance packages, can also be controlled separately under the control of the recipe, so that different temperatures are obtained for different temperature zones. Each magnetron used to produce microwaves can also have its own power controller separate from the others. By implementing the power control of the magnetrons separately, it is possible to produce a different microwave power for different places in the oven chamber. This can be implemented by means of software.

By means of the oven according to the invention, considerable improvements over known ovens can be achieved. The quality of products can be ensured as the times of keeping them in the oven become more accurate. Thanks to the flow duct, the surface area of the grease filter can be larger than the surface area of a perforated plate and the shape can be different from the shape of the perforation. The flow resistance of the grease filter to the air is greater than that of a perforated plate. Therefore, by increasing the surface area of the grease filter a maximal air flow is obtained from the fan at the same power and the shape and location of the suction-air perforation are made favourable to the location of the suction-air flow. In addition, by means of this embodiment, the grease filter can be located at an easily accessible distance from the user.

BRIEF DESCRIPTION OF THE DRAWINGS

In the following, the invention is described in greater detail with reference to the accompanying drawings, in which.

Figure 1:
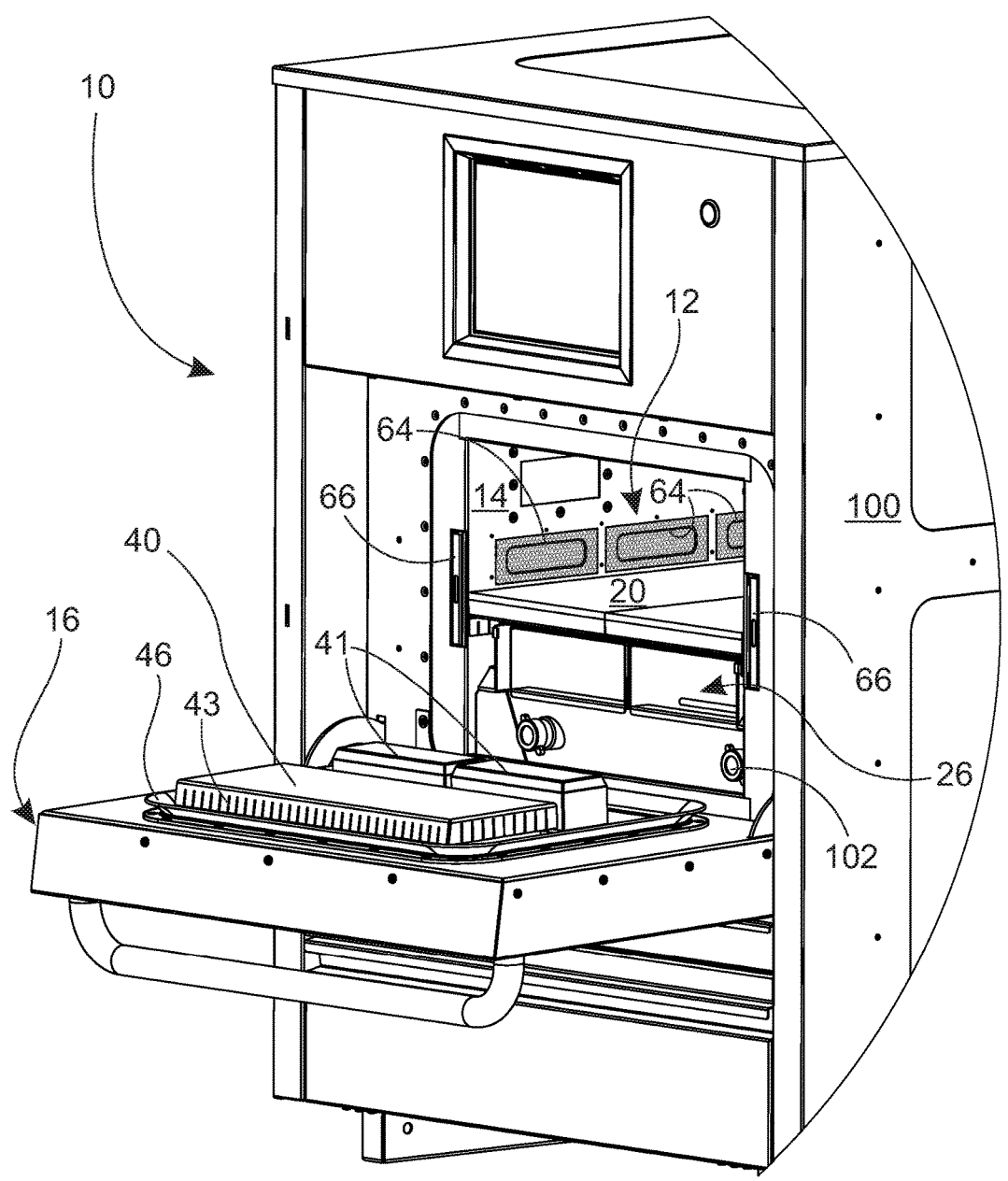
FIG. 1 shows a front view of one embodiment of the oven according to the invention, when the oven door is open.

In the figures, reference is made to the following reference numbers, which signify

| 10 | oven |
| --- | --- |
| 11 | structure |
| 12 | oven space |
| 14 | oven-space walls |
| 15 | cooker space |
| 16 | oven door |
| 18 | microwave radiation devices |
| 20 | frying plate |
| 22 | heating means |
| 24 | second heating means |
| 26 | cooker |
| 28 | cooking tank |
| 30 | thermal insulation |
| 32 | temperature zone |
| 33 | circulating-air means |
| 34 | fan |
| 35 | fan motor |
| 36 | electrical resistance |
| 37 | resistance casting |
| 38 | magnetron |
| 40 | microwave seal |
| 41 | fat-cooker shut-off element |
| 42 | water channels |
| 43 | slots |
| 44 | collector tank |
| 46 | seal |
| 48 | basket |
| 50 | basket frame |
| 52 | mesh cover |
| 54 | catalyser |
| 55 | flow connection |
| 56 | protective cover |
| 58 | upper baffle plate |
| 60 | transverse duct |
| 62 | resistance element |
| 64 | exhaust connection |
| 66 | cleaning elements |
| 68 | resistance element battery |
| 69 | grease filter |
| 70 | duct |
| 72 | condenser |
| 74 | outlet channel |
| 75 | basket lifting means |
| 76 | lifting arms |
| 77 | condenser duct opening |
| 78 | cooking-liquid surface |
| 80 | flow duct |
| 82 | ceiling |
| 83 | inlet connection |
| 84 | air-heating resistances |
| 86 | cooker heating resistances |
| 88 | wall insulation |
| 90 | cooking-liquid outlet ducts |
| 91 | outlet valves |
| 92 | oven-door end of cooker |
| 94 | front part of cooker |
| 96 | shaft |
| 98 | carrier rod |
| 100 | outer walls |
| 102 | level check opening |
| 104 | steam recovery system |
| 106 | cooling fan |
| 108 | magnetron transformers and capacitors |
| 110 | circuit-card package |
| 112 | frying-plate hinge mechanism |
| 114 | upper space |
| 116 | intermediate ducts |
| 118 | air space |
| 120 | air space |

DETAILED DESCRIPTION OF THE INVENTION

FIGS. 1-7 show one embodiment of the oven 10 according to the invention. In all embodiments, the oven 10 includes an oven space 12, which is delimited by walls 14 and an openable oven door 16 leading to the oven space 12. In addition, the oven 10 includes microwave radiation devices 18 as heating means 22, heating circulating-air means 33, and a cooker 26. The heating circulating-air means comprise a flow duct for removing the circulating air from the oven space and leading it to the oven space and a fan installed in the flow duct for creating a circulating-air flow in the flow duct. The oven 10 further includes a structure 11 delimiting the cooker space 15, in which the cooker 26 is situated, and the structure 11 includes thermal insulation 30 between the oven space 12 and the cooker space 15 for preventing heat transfer. In addition, the oven 10 preferably includes cleaning elements 66 situated in the flow duct 80 and a limited flow connection 55 between the cooker space 15 and the oven space/flow duct 80, permitting the removal of gases arising in the cooker 26 from the cooker 26 to the oven space/flow duct 80 with the aid of excess pressure. In the embodiments of FIGS. 1-7, the frying plate 20 delimits the oven space and the cooker space from each other, at the same time acting as a base for food to be fried. However, it should be understood that the cooker can also be located to the side of or above the oven space, if the structure 11 is, for example, a partition or some other delimiting structure.

Differing from FIG. 1, the oven according to the invention can also include two cookers side by side, of which one is preferably a fat cooker. The other cooker can also be a fat cooker or, for example, a cooker, in the cooking tank of which water is used as the cooking liquid. In the oven according to the invention, the heating of components of food portions can be performed at least by cooking with the cooker, frying on the frying plate with the aid of circulating air, and/or heating with the aid of microwaves. Preferably, there is also the alternative of frying on the frying plate with the aid of the frying plate's own secondary heating means. In addition to these, it is also possible to steam in the oven with the aid of steam obtained from the cooker. The oven 10 preferably also includes second heating means 24, in which case heat is produced for the primary heating means. In this connection, reference to heating means is more specifically to the different methods of heating, which includes the previously mentioned microwave heating, frying heating, circulating-air heating, and cooking heating. On the other hand, reference to secondary heating means refers, for example in the case of circulating-air heating, to an electrical resistance, which produces heat for the circulating-air means.

In FIG. 1, the oven door 16 is tilted to the open position. The cooker 26, which contains the cooking tank 28, is integrated inside the oven 10. In the embodiment of the cooker 26 depicted in FIG. 1, there are two moveable baskets, in which the food to be fried, such as potato chips, are placed. According to FIG. 2a, heating resistances 86, by means of which the cooking liquid is heated to the desired temperature, are situated in the bottom of the cooker 26.

According to FIG. 1, the oven door 16 preferably includes a microwave seal 40 for preventing the travel of microwaves, arranged to close the oven space 12 when the oven door 16 is closed. The microwave seal 40 is preferably a thin steel plate bent into shape, to be placed in the centre of the oven door 16, which corresponds in shape to the cross-sectional shape of the opening of the cooker 26. In the surface of the steel plate, there are preferably slots 43 according to FIG. 1, which act as an obstacle to the progress of microwaves, but at the same time allow gases from the cooker space 15 into the oven space 12. The construction of the microwave seal can also be some other construction that is generally known to function. The oven door preferably also includes a cooker shut-off element 41 located beneath the microwave seal 40, which consists of as many parts as there are baskets in the cooker. The shut-off element 41 corresponds in shape to the cross-section of the opening of the cooker 26. A seal 46, which is airtight and electrically conductive preferably runs round this microwave seal 40 and the cooker shut-off element 41. The seal is intended to make the oven door airtight and, at the same time, to prevent the microwaves from getting out of the oven by grounding the microwaves. This seal can be a seal like the seals of the prior art used to seal known oven doors, for example, an electrically conductive rubber-silicon seal.

Figure 2A:
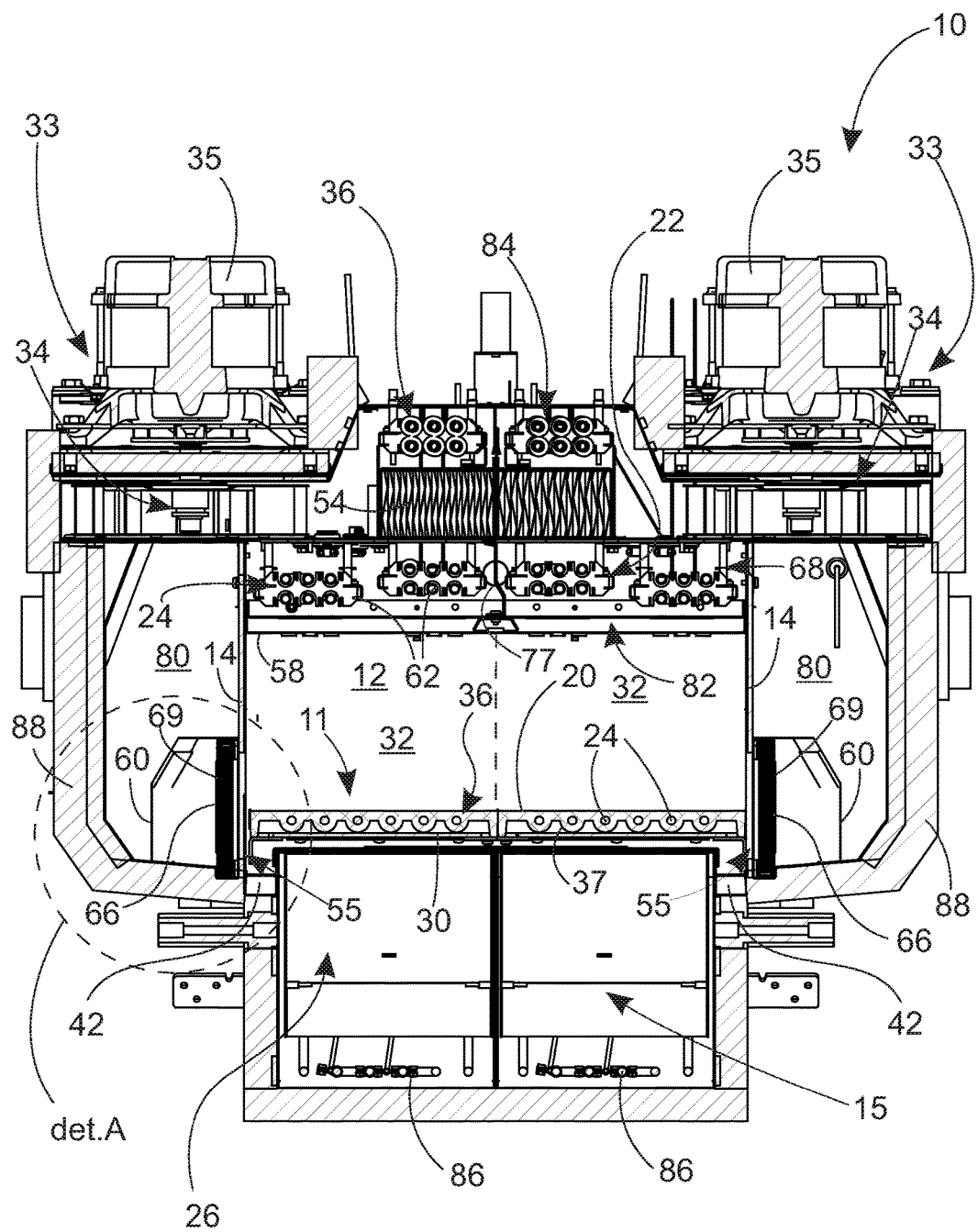
FIG. 2a shows a front view of one embodiment of the oven according to the invention, with the construction of the oven in cross-section.
Figure 2B:
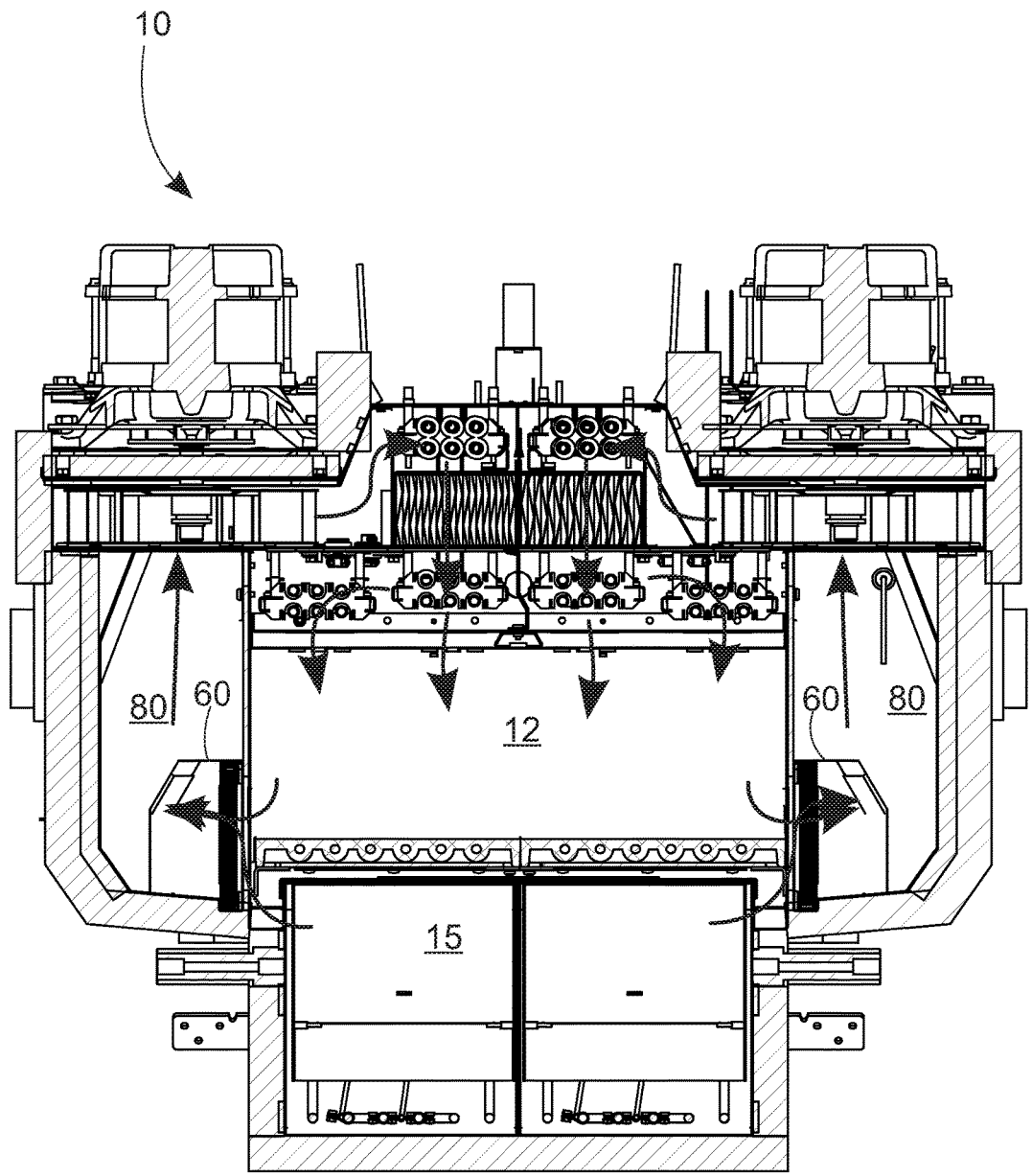
FIG. 2b shows the flow of steam in the embodiment of FIG. 2a, FIG. 3 shows the parts of the cooker separately.
Figure 3:
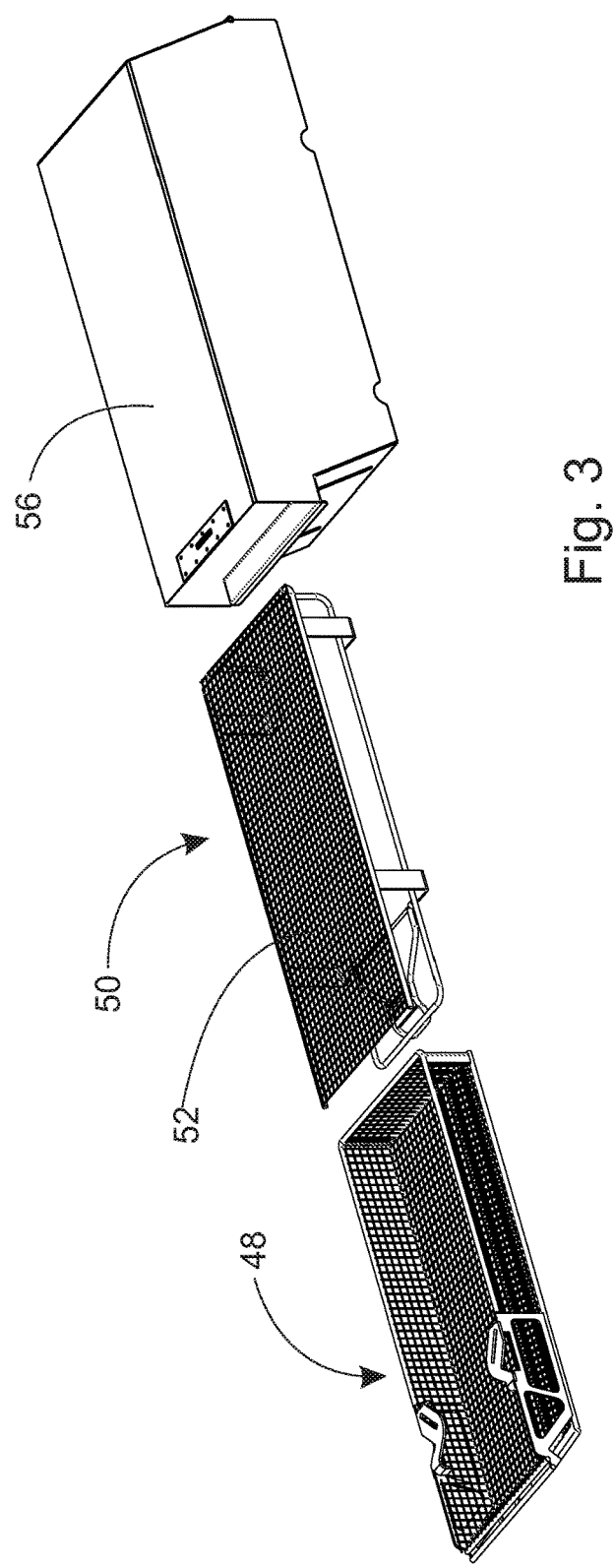
Figure 7:
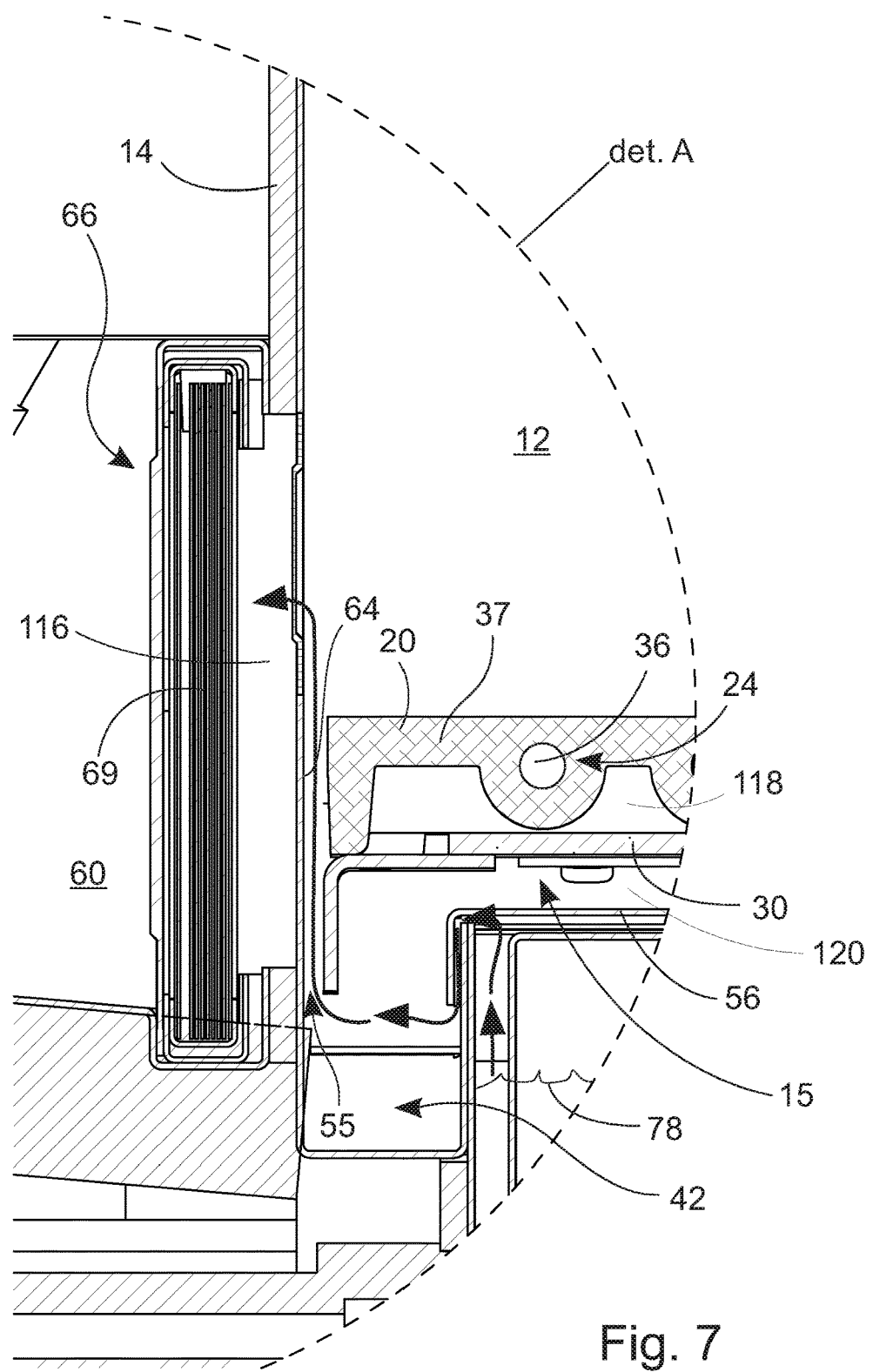
FIG. 7 shows an enlargement of detail A of FIG. 2.

FIGS. 2a-3 show the construction of the cooker 26 in greater detail. The cooker 26 preferably includes a cooking tank 28, heating resistances 86, at least one basket 48, and cooking liquid in the cooking tank 28, which is shown in FIGS. 4d and 7. The cooker 26 together with the cooking tank 28 can be pulled out of the oven 10 on guides. A detachable protective cover 56, which is a particularly dirtying component, is preferably attached to the cooker 26. Thanks to the protective-cover solution, the particularly dirtying components can be detached and washed by machine washing or some other powerful washing methods, without having to be careful with the heating resistances and similar sensitive components.

When using the cooker 26, the components of the food portion to be cooked, for example, potato chips, are placed in the basket 48, which can be, according to FIG. 3, a basket open on top, or a basket with a cover, in which the components are inside the basket. According to FIGS. 4a-4c, the cooking tank 28 of the cooker 26 is preferably open on the front side 94 above the surface of the cooking liquid 78 of FIG. 4d at the end 92 nearest the oven door 16, so that the basket 48 can be pushed into the cooker 26 underneath the frying plate 20. According to FIGS. 4a-4c, the cooking tank 28 of the bottom of the cooker 26 can include basket lifting means 75, with the aid of which the basket 48 is lifted out of and lowered into the cooking liquid in the cooking tank. The lifting means 75 preferably include lifting arms 76, which are pivoted on transverse shafts to the sides of the cooker 26. Continuations of the shafts are arranged in connection with the oven door, so that the opening of the oven door at the same time rotates the shafts in such a way that the lifting arms 76 rotate from the horizontal position according to FIG. 4a to the vertical position according to FIG. 4b. At the ends of the lifting arms 76 are carrier rods 98, on the top of which the basket 48 is supported when it is in the cooker 26, according to FIG. 4b. When the oven door is closed, the lifting arms 76 again rotate to the horizontal position, when the basket is lowered into the cooking liquid. The components being cooked in the open basket can float on the surface of the frying liquid, but, in the case of a closed basket, the construction of the basket keeps the components entirely submerged in the cooking liquid.

Figure 4A:
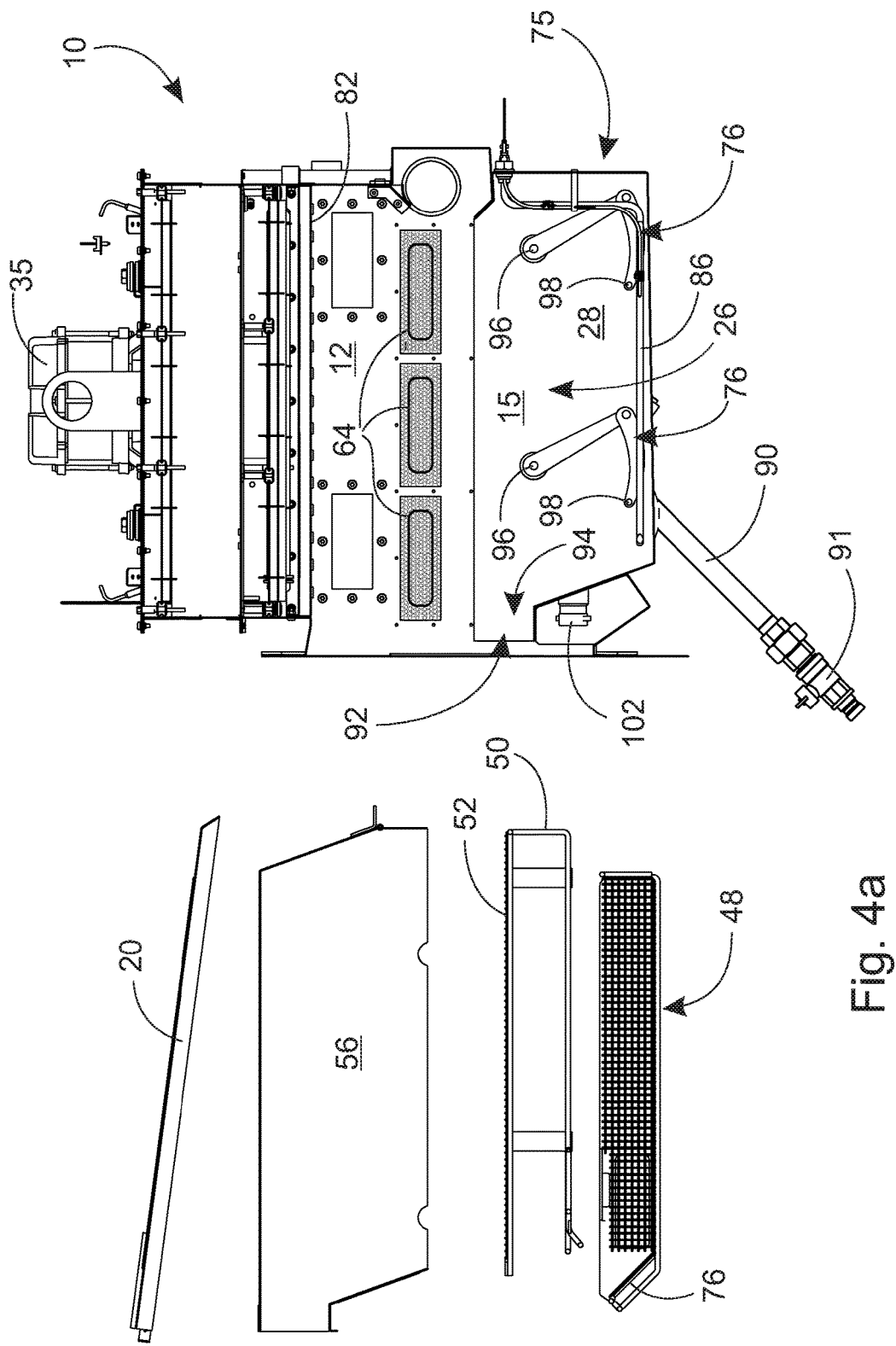
FIG. 4a shows a side cross-section of one embodiment of the oven according to the invention, with the detachable parts of the cooker outside the cooker.
Figure 4B:
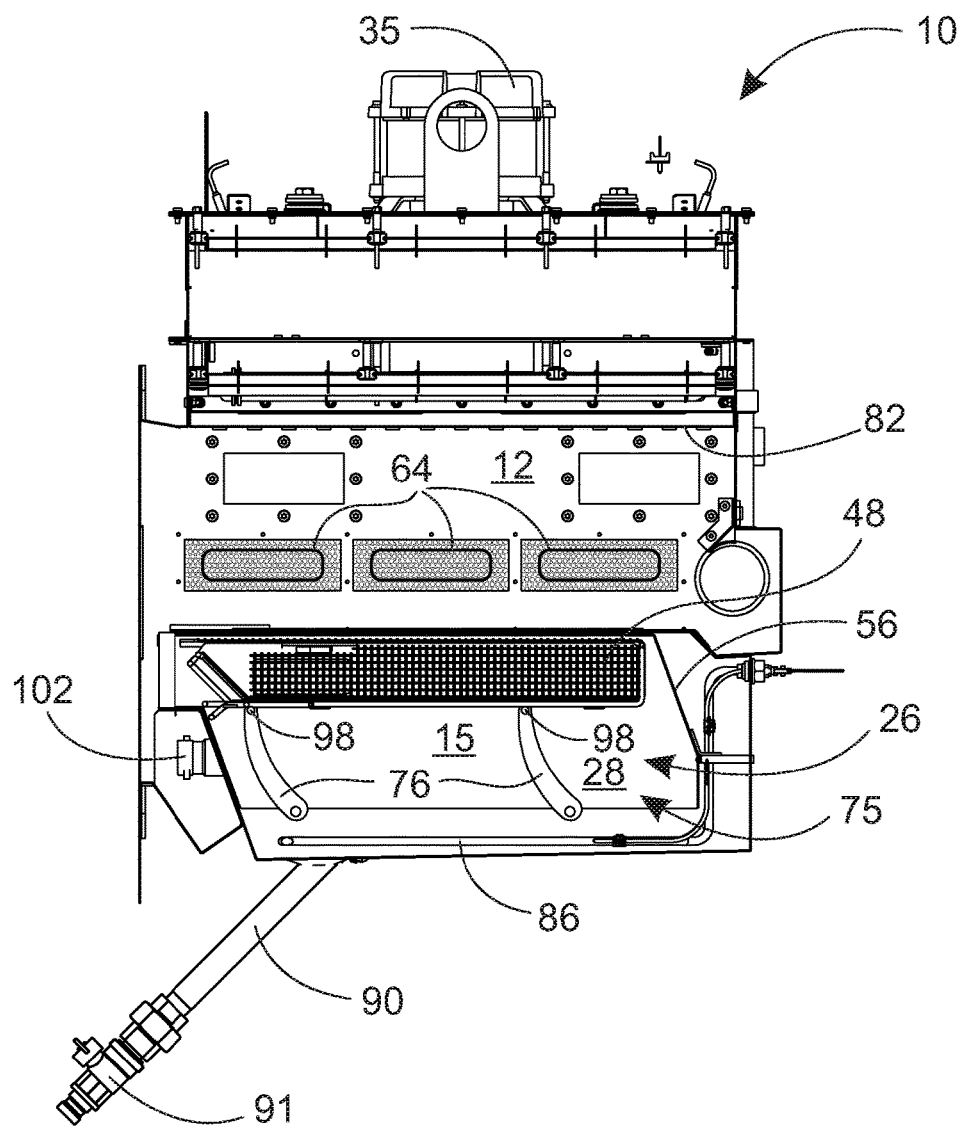
FIG. 4b shows a side cross-section of one embodiment of the oven according to the invention, with the cooker basket lifted out of the cooking liquid.
Figure 4C:
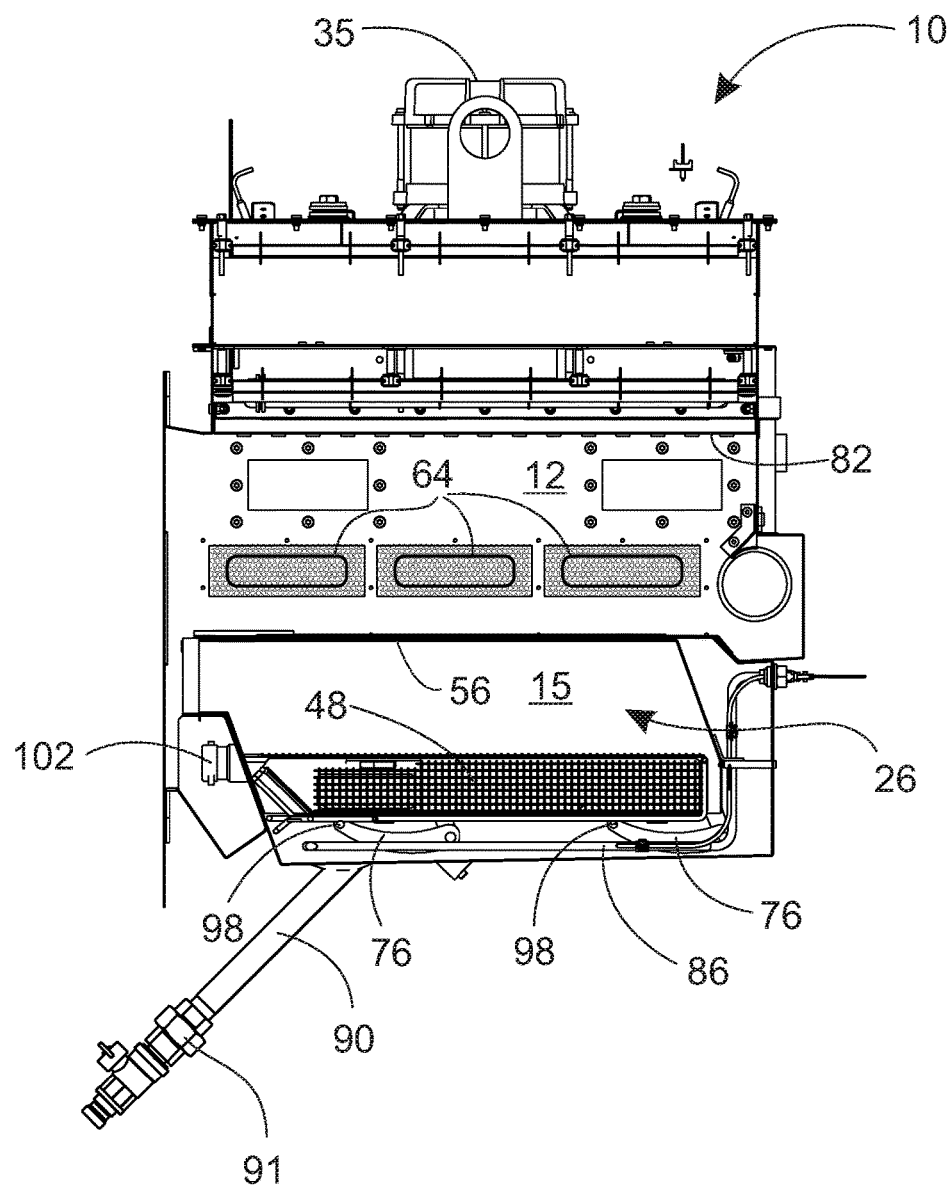
FIG. 4c shows a side cross-section of one embodiment of the oven according to the invention, with the cooker basket lowered into the cooking liquid.
Figure 4D:
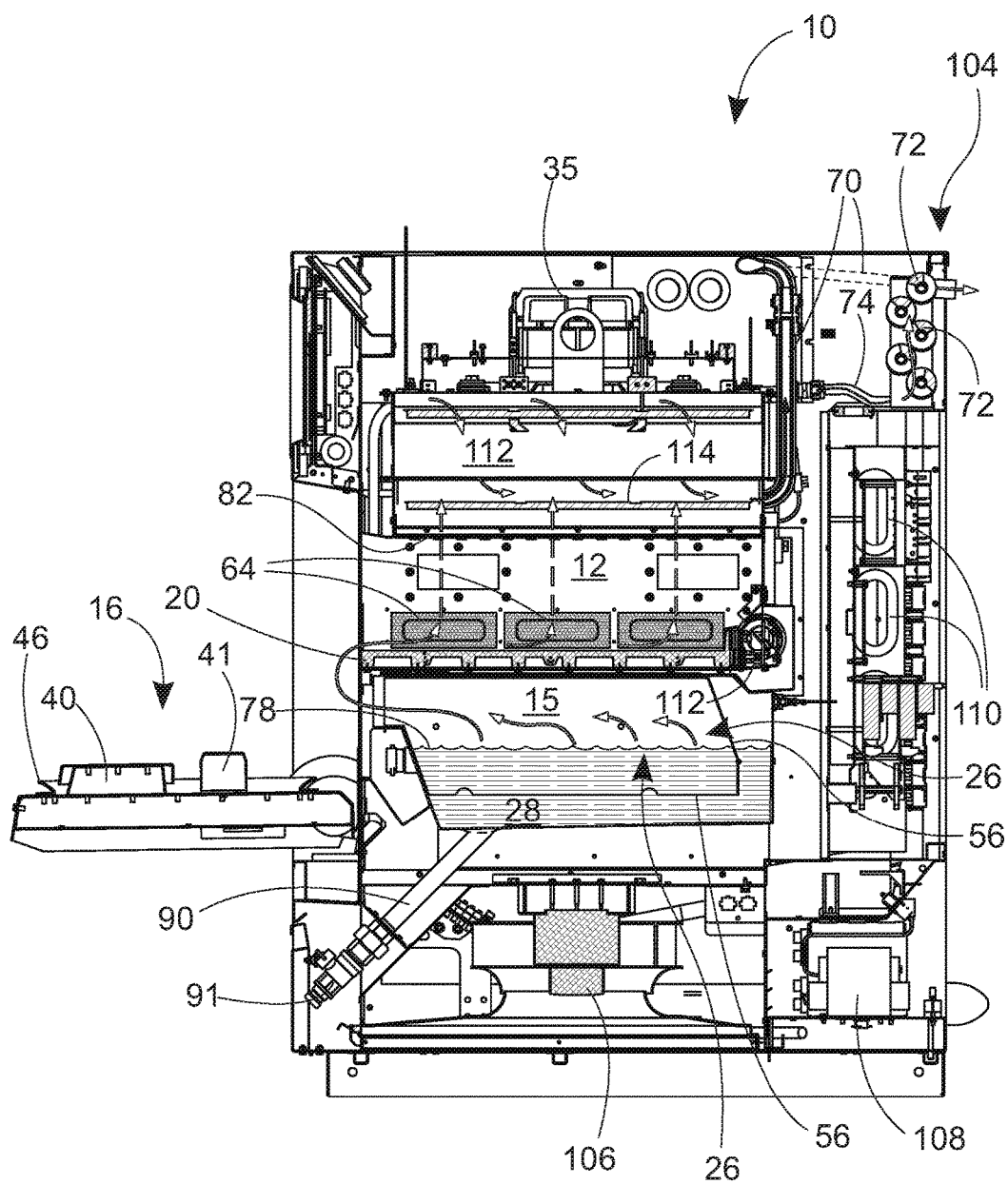
FIG. 4d shows a side cross-section of the flow of gases in one embodiment of the oven according to the invention, with the oven door open.

According to one embodiment, the cooker can include a separate basket frame 50 according to FIGS. 3 and 4a, in which the open baskets 48 are placed. The basket frame 50 can have a closed mesh cover 52, which prevents the food portion components being cooked from floating when the basket 48 is completely submerged in the cooking liquid. By means of such a system, it is possible to avoid the need for turning the components being cooked, the components being entirely submerged. The basket frame can be a metal construction, which forms a frame, inside which the basket is placed. When using the basket frame, the baskets are submerged in the cooking liquid along with the basket frame.

The cooker can include lifting means for lifting the baskets by electric control. When the basket is lifted above the surface of the cooking liquid, the components in the basket can be steamed by steaming with the cooking liquid, preferably water, in the cooking tank of the cooker. The lifting means preferably include a lifting spring, which is tensioned when the oven door is closed. The spring can be released in a controlled manner with the aid of an electrically controlled solenoid, in which case the basket can also be lifted out of the cooking liquid when the oven door is closed. When the desired cooking time has been reached, the solenoid opens the locking of the spring, when the spring rotates the lifting arms of the lifting means so that the basket rises out of the cooking liquid. According to FIGS. 4a-4d, the frying plate 20 of the oven 10 is preferably detachable, so that it can be removed for cleaning the oven. Alternatively, the frying plate can only be tiltable around the hinge mechanism 112 shown in FIG. 4d.

Outside the oven space, a vertical flow duct 80, which forms a connection from the sides of the frying plate 20 to the top of the oven space 12 according to FIG. 2a, is preferably arranged on at least one of its sides. The flow ducts 80 are preferably formed between the oven's wall insulation 88 and the walls 14 of the oven space 12. The circulating air is blown downwards from the inlet connection 83 of the ceiling 82 of the oven space 12 and sucked from near the frying plate 20, into the flow duct 80 from the exhaust connection 64 in the walls 14 above the frying plate 20. There is preferably suction perforation as protection of the exhaust connection 64, which also prevents the microwaves from progressing outside the oven space. The exhaust connections 64 can be situated, for example, 0.5 mm above the surface of the frying plate in the walls 14. The ceiling 82 is preferably a perforated metal plate, which permits the air to circulate, but prevents the microwaves from progressing outside the oven space. Above the oven space 12 there is preferably at least one fan 34, with the aid of which a flow of circulating air is created. There is preferably one fan 34 for each flow duct 80, so that the same fan 34 both sucks and blows. In air circulation implemented using one fan and motor, it is necessary to use, in addition, the aid of airflow control valves or other control elements, by means of which the airflow is divided in the desired ratio to the different air circulations.

According to FIGS. 1 and 2a, at the exhaust connection 64 of the walls 14 of the oven 10 places are formed in the walls 14 for cleaning elements 66. The gases and vapours released from the heating of food-portion components in the oven are guided to travel through the cleaning elements 66. The cleaning elements are a catalyser 54 and a grease filter 69, to which grease in the air and steam adheres. Of these, the catalyser is the more important. From the grease filter 69 air is sucked in the flow duct 80 upwards to the fan 34, which blows the air to the catalyser 54 through rapidly reacting air-heating resistances 84. The air-heating resistances 84 heat the circulating air to become sufficiently hot (usually at least 230° C.), so that the fine particles and other impurities in the air burn when the air travels through the catalyser. Both the grease filter 69 and the catalyser 54 are situated in the flow duct 80 in such a way that all the circulating air flows through them. The grease filter is preferably a panel-type filter, which can be pulled out when the oven door is open, so that its cleaning and changing is extremely simple. In the oven, there are preferably two flow ducts 80 symmetrically on each side of the oven space 12. Here the frying plate 20 prevents passage of the circulating air to the cooker 26, but the flow connections 55 preferably at the sides of the frying plate 20 permit the passage of gases and smoke in the cooker space to the exhaust connections 64.

According to FIG. 2a, in the oven there are preferably two flow ducts 80, which are separate from each other over the entire distance, so that separate circulating-air flows are guided to the temperature zones 32 on the left and right sides of the oven 10. Once the airflow has travelled through each part of the catalyser 54, the circulating air preferably meets a resistance-element battery 68 consisting of at least two resistance elements 62, which in this connection can be second heating means 24 for heating the circulating air. The resistance battery can also be implemented using one resistance element. Each resistance element 62 is directed to heat a specific part of the circulating air flow. The resistance elements 62 of the resistance-element battery 68 can be preferably controlled independently of each other, so that the circulating air led through them receives an individual temperature when passing through each resistance element 62. For its part, this permits the creation of temperature zones 32 with different temperatures in the oven space 12 using the circulating air flows of different temperatures. The heated air flow that has travelled through the resistance elements 62 then travels through the upper baffle plate 58 forming the ceiling 82 of the oven 10, which guides the airflow so that temperature zones 32 with at least two different temperatures are formed in the oven space 12.

According to FIG. 2b, the evaporating moisture and frying smoke in the cooker 26 move, thanks to the excess pressure forming in the cooker space 15, preferably through the flow connections 55 in the sides of the frying plate 20 from the cooker space 15 to the oven space 12, where they travel from the exhaust connections 64 in the sides of the frying plate 20 to the flow duct 80 and through it to the fan 34. The fan 34 blows the circulating air through the air-heating resistances 84 to the catalyser 54 and from there on to the second heating means 24. After this, the circulating air travels through the inlet connections 83 of the ceiling 82 back to the oven space 12.

FIG. 4d shows the flow routes of vapours and smoke arising in the cooker space 15 and oven space 12, when the oven door 16 is open. According to FIG. 4d, the smoke and vapours travel through the exhaust connections 64 to the flow ducts 80, in which the vacuum created by the fans 34 suck them through the fans 34 to the catalyser 54. The catalyser 54, the air-heating means 84 for it, and the second heating means of the circulating air means are all preferably in the upper space 114, in which excess pressure is created with the aid of the fan 34. A condenser duct opening 77 is located in the upper space 114, from where the recovery-system 104 duct 70 starts, through which the vapours are led to the condenser 72. With the aid of such an arrangement, the exhaust connections 64 suck the vapour and smoke so effectively to the catalyser and condenser that the passage of the vapours and smoke outside the oven is prevented almost completely.

Figure 5:
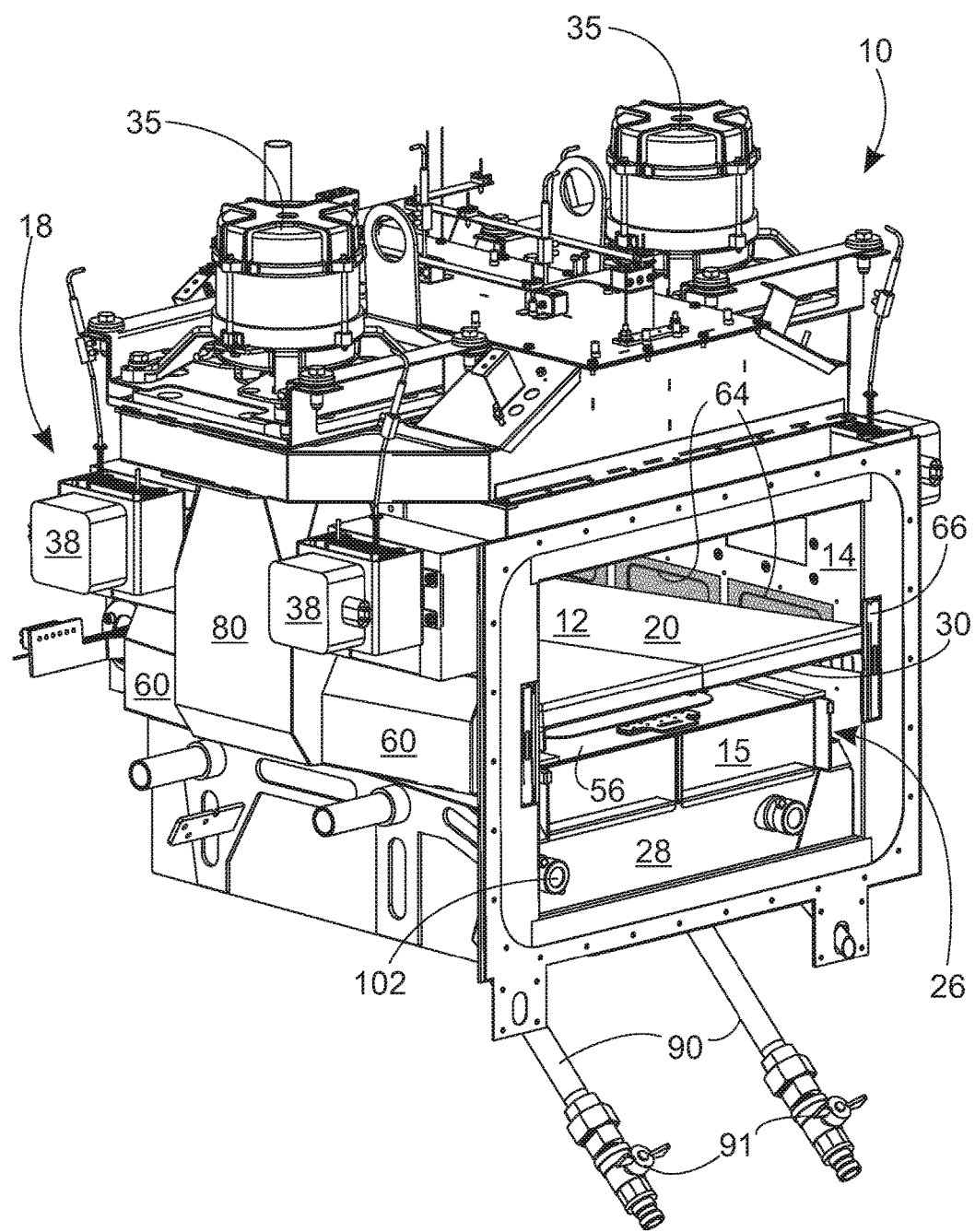
FIG. 5 shows an axonometric view of the construction of the oven, shown without the oven door and the external walls.

According to FIGS. 2a and 5, the active frying plate 20 is preferably located above the cooker 26. Between the frying plate 20 and the cooker 26 there can be thermal insulation 30, which prevents the transfer of heat from the oven space 12 to the cooker space 15. Beneath the frying plate 20 there can be an air space as thermal insulation or preferably an encased thermal-insulation board. It is also possible to use a separate cooled air flow. Preferably the electrical resistance 36 of the frying plate 20 is situated inside the frying plate 20 above the thermal insulation 30 and a light-construction rapidly-reacting frying surface is attached on top of the electrical resistance 36. The frying surface can be, for example, an aluminium-alloy casting, or of some other metal suitable for the purpose. The degree of filling of the cooking tank of the cooker can be checked from a check opening 102 and when the cooking tank is full the used cooking liquid can be removed from the cooking tank through cooking-liquid outlet ducts 90, using outlet valves 91. The filling of the cooking tank can, in turn, be performed by way of the oven door.

For microwave heating, the oven includes at least one magnetron 38 according to FIG. 5, which creates microwaves in the oven space. The number of magnetrons used in the oven preferably corresponds to the number of temperature zones to be arranged in the oven space. With the aid of microwave heating, it is advantageously possible to defreeze food-portion components very rapidly, which would otherwise be impossible using circulating air or the frying plate. Microwave heating cannot be restricted particularly to a specific temperature zone, but instead when microwave heating is being used all the components on the frying plate in the oven space receive some kind of heating effect. The operation of the magnetrons is, however, controlled in such a way that, when it is desired to heat a specific temperature zone in the oven space, precisely the magnetron nearest to this temperature zone is used, when the effect of the microwaves transmitted by the magnetron will be greatest on the food-portion component in this temperature zone.

Although the second heating means in FIGS. 1-7 are formed with the aid of electrical resistances, it should be understood that induction or gas heating, for example, can also be used as the heating means in the oven according to the invention. In an induction-heated oven, an electrical field, which makes the thermal surface of the frying plate become hot, can be induced in the frying plate with the aid of a varying magnetic field. Gas heating can be used in place of electrical resistances for heating the circulating air, in which case gas is burned with the aid of a burner to create heat.

In the oven according to the invention, each of the components of a food portion on the frying plate can be heated using one or more manners of heating, i.e. microwaves, circulating air, or by using the frying plate, simultaneously or periodically. In other words, for example mashed potato can be heated using one temperature zone, for example, using simultaneously microwaves, circulating air, and the frying plate at a temperature of 220° C., while at the same time a steak is being fried in the adjacent temperature zone using only circulating air and the frying plate at a temperature of 340° C. Usually, the temperatures used in the oven are in the range 200-350° C., but in the case of certain products the temperature can be lower or higher than the aforementioned range, in which case the temperatures can vary in the range 100-500° C.

Figure 6:
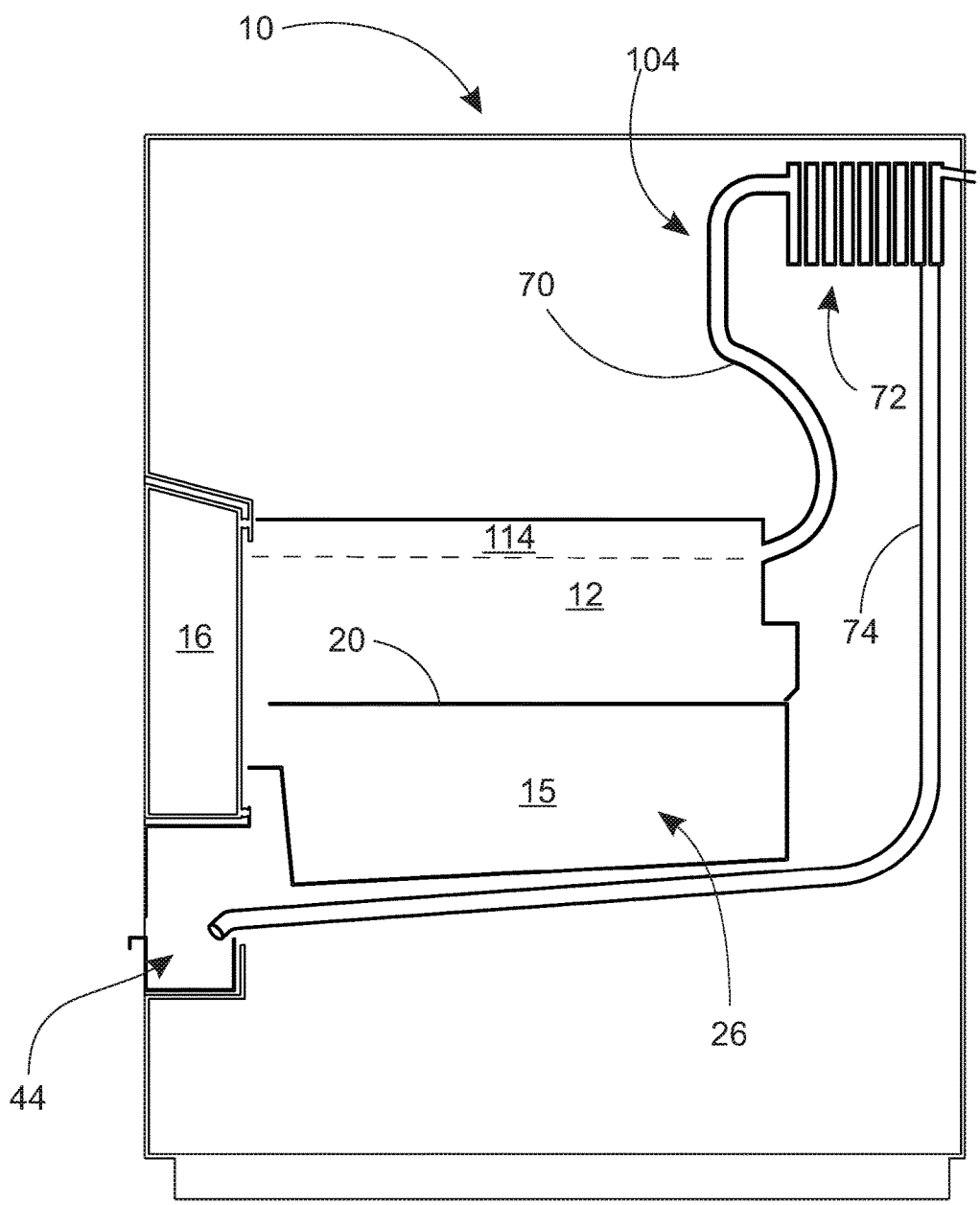
FIG. 6 shows a side schematic diagram of the steam recovery system used in one embodiment of the oven.

FIG. 6 shows a schematic diagram of the steam recovery system 104 preferably used in the oven according to the invention. The recovery system can include a duct 70 leading from the oven space 12, which is led to a condenser 72 that is preferably higher than the oven space 12 in the oven 10. The water in the components evaporates to become water vapour as a result of the heating of the components performed on the frying plate 20 and in the cooker 26. Water vapour and smoke are sucked into the flow duct 80 of the circulating-air means and blown with the aid of the fan 34 through the catalyser to the upper space 114. Finally, the water vapour ends up through the duct 70 from the upper space 114 at the condenser 72, where it is condensed into water against the cold condenser surfaces. An outlet channel 74 is formed from the condenser 72 downwards, along which the water can be led to the collection tank 44, which can be easily emptied. FIG. 6 does not show the flow duct and other parts belonging to the circulating-air means, with the aid of which the circulating air and along with it also the water vapour and smoke are transferred from the oven space to the upper space.

According to FIG. 7, water channels 42, the purpose of which is to collect the liquid coming from the food-portion components heating on the frying plate 20, are formed in the walls of the oven space to run round the frying plate. The water channels 42 preferably run round the frying plate 20 and a collector line leaves the water channels, to collect the liquid. The liquid can be led, for example, to the same collector tank 44 of FIG. 6, in which the liquid coming from the condenser 72 is collected. According to FIG. 7, there can be a separate intermediate duct 116 between the grease filter 69 and the wall 14 of the oven, which forms a separate air duct. According to FIG. 7, the thermal insulation between the oven space 12 and the cooker space 15 is also formed, in addition to the thermal insulation 30, of air spaces 118 and 120, as well as a protective cover 56. Together, these form effective insulation.

As something that does not belong to the invention, it can be stated that the oven can also be implemented without a cooker, in which case the oven includes only microwave means, circulating-air means, and a frying plate as heating means, of which at least one heating means is arranged to create at least two different temperature zones in the oven space. By means of such an oven, a possibility is achieved, compared to ovens of the prior art, to prepare several different components simultaneously in the oven, each component being at its specific heating temperature. The components to be cooked would then be prepared in a separate cooker. Further, as an idea separate from the invention, the oven can, in applicable parts and with a new configuration, also be applied without air circulation, implemented with the aid of a hood. The use of the hood then replaces the use of the cleaning element and the catalyser.

The invention claimed is:
1. An oven for heating and frying food, comprising:
walls and an openable oven door delimiting an oven space;
heaters to heat food in the oven space, including:
microwave radiation devices,
a frying plate having an under-surface, the frying plate delimiting a cooker space, the frying plate being divided into at least two parts, each of which parts has an independently operating secondary heater;
heat circulating-air devices comprising a flow duct for removing circulating air from the oven space and leading it back into the oven space after cleaning, and a fan installed in the flow duct for creating a circulating-air flow in the said flow duct;
thermal insulation between the oven space and the cooker space; and
a cooker situated in the cooker space, the cooker having a cooking tank, heating resistances, at least one basket, and cooking liquid in the cooking tank,
wherein in the oven at least one of the heaters is arranged to create at least two different temperature zones with different temperatures in the oven space.
2. The oven according to claim 1, further comprising cleaning elements situated in the flow duct.
3. The oven according to claim 2, further comprising a limited flow connection between the cooker space and the oven space or flow duct permitting gases and vapours arising in the cooker to be removed to the oven space or flow duct and from there through the said cleaning elements.

4. The oven according to claim 3, wherein the flow connection is 0.5-4-mm wide.

5. The oven according to claim 3, wherein the flow connection is 1-2-mm wide.

6. The oven according to claim 2, wherein the cleaning elements are at least one of a catalyser and a grease filter.

7. The oven according to claim 1, wherein the structure is a frying plate arranged to delimit the cooker space to beneath the oven space.

8. The oven according to claim 1, wherein the microwave radiation devices comprise at least two magnetrons for creating the temperature zones.

9. The oven according to claim 1, wherein the heat circulating-air devices comprise a second heater having electrical resistance heaters to heat the circulating air.

10. The oven according to claim 1, wherein the heat circulating-air devices comprise at least two fans together with motors and two second heaters having electrical resistance heaters to create two different air circulations for circulating-air heating.

11. The oven according to claim 1, wherein the thermal insulation is fitted to the under-surface of the frying plate.

12. The oven according to claim 1, wherein the secondary heater comprises electrical resistance heaters.

13. The oven according to claim 1, wherein the walls of the oven comprise water channels running round the frying plate and a collector tank, to which the water channels are led for recovering liquid coming from food on the frying plate.

14. The oven according to claim 1, wherein the oven door comprises an airtight seal arranged to close both the oven space and the cooker simultaneously from in front when closing the oven door.

15. An oven for heating and frying food comprising:
walls and an openable oven door delimiting an oven space;
heaters to for heat food in the oven space, including:
microwave radiation devices,
a frying plate having an under-surface, the frying plate delimiting a cooker space, and
heating circulating-air devices comprising a flow duct for removing circulating air from the oven space and leading it back into the oven space after cleaning, and
a fan installed in the flow duct for creating a circulating-air flow in the said flow duct;
thermal insulation between the oven space and the cooker space; and
a cooker situated in the cooker space, the cooker having a cooking tank, heating resistances, at least one basket, and cooking liquid in the cooking tank,
wherein the oven comprises separate and moveable baskets to be placed in the cooking tank for placing food in the baskets to put the baskets into and take the baskets out of the cooking tank, and a basket frame, into which the baskets are arranged to be placed, which basket frame comprises a mesh cover for keeping food submerged in cooking liquid.

16. An oven for heating and frying food comprising:
walls and an openable oven door delimiting an oven space;
heaters to for heat food in the oven space, including:
microwave radiation devices,
a frying plate having an under-surface, the frying plate delimiting a cooker space, and
heating circulating-air devices comprising a flow duct for removing circulating air from the oven space and leading it back into the oven space after cleaning, and
a fan installed in the flow duct for creating a circulating-air flow in the said flow duct;
thermal insulation between the oven space and the cooker space; and
a cooker situated in the cooker space, the cooker having a cooking tank, heating resistances, at least one basket, cooking liquid in the cooking tank, and
a detachable protective cover.

17. The oven according to claim 15, wherein the oven comprises a lifting device having lifting arms for lifting the baskets under electrical control.

18. The oven according to claim 1, further comprising a steam recovery system to recover water vapour.

19. The oven according to claim 18, wherein the recovery system comprises a condenser.

20. The oven according to claim 1, wherein the walls are thermally insulated, permitting a controlled transfer of heat from the oven space outwards.

* * * * *